Patented June 9, 1942

2,285,948

UNITED STATES PATENT OFFICE 2,285,948

TEXTILE-TREATING CHEMICAL AND PROCESS OF MAKING SAME

John B. Rust, Verona, N. J., assignor to Ellis-Foster Company, a corporation of New Jersey No Drawing. Application May 10, 1941, Serial No. 392,937

12 Claims. (Cl. 260—295)

This invention relates to water-soluble reaction products of a tertiary amine with the product formed from the reaction of a long chain nitrile, a long chain acid chloride and formaldehyde, said products being valuable in treating textile fabrics. The invention also relates to the process of making such products.

According to the process of the present invention a long chain fatty acid nitrile having a carbon chain of more than nine carbon atoms is reacted with a long chain fatty acid chloride having a carbon chain of more than nine carbon atoms in the presence of formaldehyde. The reaction product so formed is then reacted with a tertiary amine to produce a compound which is soluble in water to form strongly foaming solutions. The preliminary reaction between nitrile, acid chloride and formaldehyde is conveniently carried out by heating the reactants at elevated temperatures of from 50° to 60° C. up to 110° C. or somewhat higher. Inert diluents such as toluene, dioxan and the like may be employed if desired, which may be subsequently eliminated by distillation, or the reaction product removed by crystallization or precipitation. The reaction may be catalyzed in some cases with acid salts such as zinc chloride, aluminum chloride and the like. The reaction product which has been formed according to the procedure outlined above is then mixed with a tertiary amine, whereupon an exothermic reaction usually occurs with the formation of a water-soluble salt. As tertiary amines I prefer to employ pyridine, quinoline, trimethylamine, alpha picoline, or technical mixtures such as pyridine bases which contain picoline and lutidine in addition to pyridine.

The water-soluble reaction products of the present invention are admirably suited for treating textile fabrics to which they impart a soft suede hand. Furthermore, it has been found that if a cotton, rayon, acetate or wool fabric which has been treated with a 1% to 10% solution of the water-soluble products of the present invention is heated at an elevated temperature of about 100° C. and preferably between 140° C. and 170° C., the product becomes fixed on the fabric and imparts thereto an excellent water-repellent finish.

The mechanism of the reaction between the nitrile, acid chloride and formaldehyde appears to be obscure, but whatever the type of reaction product thus produced it is probable that a quaternary ammonium compound is formed when it is treated with a tertiary amine. However, I do not wish to be limited by theoretical possibilities. As the nitrile component of the products of the present invention I may employ, for example, lauronitrile, myristonitrile, palmitonitrile, stearonitrile, arachidonitrile, and the like, or the higher esters of the half nitrile of adipic acid, sebacic acid and the like or nitriles of the type of, for instance, dodecylbenzonitrile, octadecylbenzonitrile and the like. As the acid chloride component I may employ for example: decanoyl chloride, dodecanoyl chloride, palmityl chloride (hexadecanoyl chloride), stearyl chloride (octadecanoyl chloride), behenyl chloride (docosanoyl chloride) and the like, or acid chlorides such as decylbenzoyl chloride, hexadecyl benzoyl chloride and the like. I have also tried the reaction products of short chain nitriles with long chain acid chlorides and long chain nitriles with short chain acid chlorides but find that those products from nitrile and acid chloride wherein the chain length is as above prescribed are superior as regards rendering textile fabrics water-repellent.

The following examples are given to illustrate the products and process of the present invention. All proportions are given in parts by weight.

*Example 1.*—137.3 parts of palmityl chloride (hexadecanoyl chloride), 132.7 parts of stearonitrile, 22.5 parts of paraformaldehyde and 1.4 parts of zinc chloride were heated together with constant agitation at an average temperature of 77° C. for 22½ hours. The reaction product which resulted was soft and waxy at ordinary temperatures. It was cooled to 40° C. and 40 parts of pyridine added slowly. During the addition the temperature rose to 55° C. and was held at this value by the rate of addition of the pyridine. When all of the pyridine had been added the mixture was heated at 60° C. with agitation for 3 hours, then without agitation for 20 hours at 65° C. When cooled to room temperature the resulting product was a hard, rather high-melting wax. This wax was very readily soluble in warm water to produce strongly foaming solutions.

*Example 2.*—120.6 parts of lauronitrile, 145.6 parts of lauryl chloride (dodecanoyl chloride), 40 parts of paraformaldehyde, and 2.5 parts of zinc chloride, were heated at 75°–80° C. with mechanical stirring for 23 hours. A pale brown liquid was obtained which tended to crystallize at below room temperature. When the temperature was adjusted to 40° C., 52.6 parts of pyridine were slowly added. The temperature rose to 65° C. during this addition. When all the pyridine had been added the temperature was taken to 75° C. and held with stirring for 7 hours.

then at 75° C. for 13 hours without stirring. The material when cooled to room temperature was hard and waxy. It was readily soluble in warm water to form foaming solutions.

*Example 3.*—90.5 parts of lauronitrile, 137.3 parts of palmityl chloride, 30 parts of paraformaldehyde and 2.3 parts of zinc chloride were heated at 75°–80° C. with stirring for 24 hours. The reaction product was cooled to about 40° C. and 40 parts of pyridine added slowly, whereupon an exothermic reaction occurred. The mixture was stirred for 3 hours at 65° C. and heating continued without stirring for an additional 18 hours. At room temperature the resulting material was hard and waxy. It was readily soluble in warm water to form a foaming solution.

*Example 4.*—43.5 parts of lauronitrile, 66 parts of palmityl chloride, 14.4 parts of paraformaldehyde and 125 parts of toluol were heated with a direct flame under a reflux condenser at boiling for 5 hours. The temperature was allowed to drop to 60°–70° C. and 19 parts of pyridine added. The material so formed was readily dispersible in water.

*Example 5.*—192.6 parts of a commercial mixture of fatty acid chlorides (which consists of 70% hexadecanoyl chloride, 25% octadecanoyl chloride and 5% unreacted fatty acids and comprises the acid chlorides obtained from a mixture of stearic and palmitic acids), 176.8 parts of stearonitrile, 40 parts of paraformaldehyde and 3.6 parts of zinc chloride were heated together with constant agitation at 75°–80° C. for 21 hours. 137 parts of the reaction product were removed and 35 parts of pyridine added to the 276 parts remaining. This was heated at 70°–75° C. with agitation for 3 hours, then for 16 hours without stirring. A very hard brittle wax resulted on cooling which was readily soluble in water.

The 137 parts which were removed were treated as follows:

| | Parts |
|---|---|
| (a) Reaction product | 30 |
| Quinoline | 6.8 |

An exothermic reaction occurred with the formation of a very hard, brittle red wax which was readily soluble on warming with water.

| | Parts |
|---|---|
| (b) Reaction product | 20 |
| Alpha picoline | 3.2 |

The mixture was heated at 70° C. for 16 hours. When cool a hard, brittle wax was formed which was readily water-soluble.

| | Parts |
|---|---|
| (c) Reaction product | 20 |
| Tributylamine | 6.6 |

Heated at 70° C. for 16 hours. A soft wax resulted which could easily be dissolved in water.

| | Parts |
|---|---|
| (d) Reaction product | 30 |
| Triethanolamine | 7.9 |

Heated at 70° C. for 16 hours to secure a hard wax which could be dissolved in warm water.

The above examples illustrate the practice of the present invention but are in no way to be construed as limiting. It is apparent from consideration of the examples that a definite reaction occurs between the nitrile, acid chloride and paraformaldehyde since none of these materials separately are water-soluble and the final reaction product with a tertiary amine can be readily dissolved in water. I prefer to employ in the process of the present invention a nitrile and an acid chloride having a chain length of about an equal number of carbon atoms, but this is not essential since, for instance, the reaction product of lauronitrile with octadecanoyl chloride and formaldehyde is satisfactory in some cases. Where only a soft hand is desired in textile materials they may be treated with the reaction product of, for instance, lauronitrile, lauryl chloride, formaldehyde and pyridine. However, where a good water-repellent finish is desired as well as a soft hand it is well to use as long a carbon chain as possible as, for instance, the reaction product of stearonitrile, octadecanoyl chloride, paraformaldehyde and pyridine.

In employing the compounds of the present invention on textile fabrics as water-repellents I have found that the preferable procedure is to dissolve the material in water to form about a 5% solution, although from 1% to 10% may be used if desired. The impregnated fabric is dried at a relatively low temperature (40°–80° C.) for a short time until thoroughly dried, then baked on the fabric at above 100° C. and preferably at 120° C. to 170° C. for from 1 to 20 minutes. Below is given a table of results obtained with the compounds illustrated by the foregoing examples. A cotton gabardine fabric was used and impregnated with a 5% aqueous solution of the compound. The fabric was squeezed between rubber rolls, dried at 70° C. and baked at 145° C. for 15 minutes to fix the compound on the cloth. The degree of water-repellency was ascertained by fastening a sample of the treated cloth in a 6 inch metal embroidery hoop placed at a 45° angle under a 6 inch glass laboratory funnel to which was attached by a 2 inch rubber tubing a spray nozzle. The bottom of the spray nozzle was 6 inches above the surface of the cloth and 250 cc. of water at 80° F. was allowed to flow through the nozzle onto the cloth sample. A rating of 100 was given if no water adhered to the cloth. 90 indicated slight spotting, 80 a surface wetting only where the water spray impinged, and 50 a surface wetting of 50% the area covered by the spray. In the table the second column shows the water-repellency after the fabric from the fixing oven had been rinsed and dried; the third column indicates water-repellency after the treated fabric had been given a standard wash of 40 minutes in hot water with a 0.5% solution of neutral soap; the fourth column gives the results after the treated fabric had been soaked in Stoddard solvent for 20 minutes.

| Sample No. — | Original reading | Reading after washing | Reading after dry cleaning |
|---|---|---|---|
| 1 | 90 | 85 | 75 |
| 2 | 80 | 85 | 75 |
| 3 | 90 | 85 | 80 |
| 4 | 70 | 70 | 65 |
| 5 | 100 | 100 | 85 |
| 5a | 95 | 95 | 95 |
| 5b | 100 | 100 | 100 |
| 5c | 90 | 90 | 80 |

What I claim is:

1. The process which comprises heating at an elevated temperature: formaldehyde, a nitrile containing a chain of more than 9 carbon atoms, and an acid chloride containing a chain of more than 9 carbon atoms until a reaction product has been obtained, and thereafter heating said reaction product with a tertiary amine until a water-soluble product has been secured.

2. The process which comprises heating at a temperature of from about 50° C. to about 110° C.: formaldehyde, a fatty acid nitrile of more than 9 carbon atoms, and a fatty acid chloride of more than 9 carbon atoms until a reaction product has been obtained, and thereafter heating said reaction product with a tertiary amine until a water-soluble product has been secured.

3. The process of claim 2 wherein the formaldehyde, nitrile and acid chloride are heated in the presence of a condensing agent selected from the group consisting of zinc chloride and aluminum chloride.

4. The process of claim 2 wherein the formaldehyde, nitrile and acid chloride are heated in the presence of an inert diluent.

5. The process which comprises heating formaldehyde, stearonitrile and octadecanoyl chloride at an elevated temperature until reaction has occurred, and thereafter heating said reaction product with a tertiary amine.

6. The process which comprises heating formaldehyde, stearonitrile and hexadecanoyl chloride at an elevated temperature until reaction has occurred, and thereafter heating said reaction product with a tertiary amine.

7. The process which comprises heating formaldehyde, stearonitrile and the acid chlorides obtained from a mixture of palmitic and stearic acids until a reaction has occurred, and thereafter heating said reaction product with pyridine.

8. The reaction product of a tertiary amine with the compound formed from the reaction of a nitrile containing a chain of more than 9 carbon atoms, an acid chloride containing a chain of more than 9 carbon atoms and formaldehyde.

9. The reaction product of a tertiary amine with the compound formed from the reaction of a fatty acid nitrile of more than 9 carbon atoms, a fatty acid chloride of more than 9 carbon atoms and formaldehyde.

10. The reaction product of a tertiary amine with the compound formed from the reaction of stearonitrile, octadecanoyl chloride and formaldehyde.

11. The reaction product of a tertiary amine with the compound formed from the reaction of stearonitrile, hexadecanoyl chloride and formaldehyde.

12. The reaction product of pyridine with the compound formed from the reaction of stearonitrile, hexadecanoyl chloride and formaldehyde.

JOHN B. RUST.